US012122552B2

(12) United States Patent
Schoen

(10) Patent No.: US 12,122,552 B2
(45) Date of Patent: Oct. 22, 2024

(54) BLOW LABELER

(71) Applicant: Bizerba SE & Co. KG, Balingen (DE)

(72) Inventor: Thomas Schoen, Balingen (DE)

(73) Assignee: Bizerba SE & Co. KG, Balingen (DE)

( * ) Notice: Subject to any disclaimer, the term of this patent is extended or adjusted under 35 U.S.C. 154(b) by 16 days.

(21) Appl. No.: 17/839,204

(22) Filed: Jun. 13, 2022

(65) Prior Publication Data

US 2022/0402641 A1 Dec. 22, 2022

(30) Foreign Application Priority Data

Jun. 16, 2021 (EP) .................................... 21179819

(51) Int. Cl.

| | |
|---|---|
| ***B65C 9/28*** | (2006.01) |
| ***B65C 9/02*** | (2006.01) |
| ***B65C 9/18*** | (2006.01) |
| ***B65C 9/40*** | (2006.01) |
| ***B65C 9/42*** | (2006.01) |

(52) U.S. Cl.

CPC .................. *B65C 9/28* (2013.01); *B65C 9/02* (2013.01); *B65C 9/1876* (2013.01); *B65C 9/42* (2013.01); *B65C 2009/408* (2013.01)

(58) Field of Classification Search

CPC ........... B65C 9/28; B65C 9/02; B65C 9/1876; B65C 9/42; B65C 2009/408; B65C 2009/0053

See application file for complete search history.

(56) References Cited

U.S. PATENT DOCUMENTS

| | | | | |
|---|---|---|---|---|
| 4,612,079 A | | 9/1986 | Ostrow | |
| 4,707,211 A | * | 11/1987 | Shibata | B26D 5/20 156/499 |
| 5,865,918 A | | 2/1999 | Franklin et al. | |

(Continued)

FOREIGN PATENT DOCUMENTS

| | | |
|---|---|---|
| DE | 195 45 191 A1 | 6/1997 |
| DE | 10 2009 041 470 A1 | 3/2011 |

(Continued)

OTHER PUBLICATIONS

European Search Report dated Dec. 13, 2021 from European Application No. 21179819.4 (nine pages).

(Continued)

*Primary Examiner* — George R Koch

(74) *Attorney, Agent, or Firm* — Kilpatrick Townsend & Stockton LLP

(57) ABSTRACT

The invention relates to a blow labeler for applying labels to packages, comprising a blower head having a base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface.

32 Claims, 7 Drawing Sheets

(56) References Cited

U.S. PATENT DOCUMENTS

Figure 1:
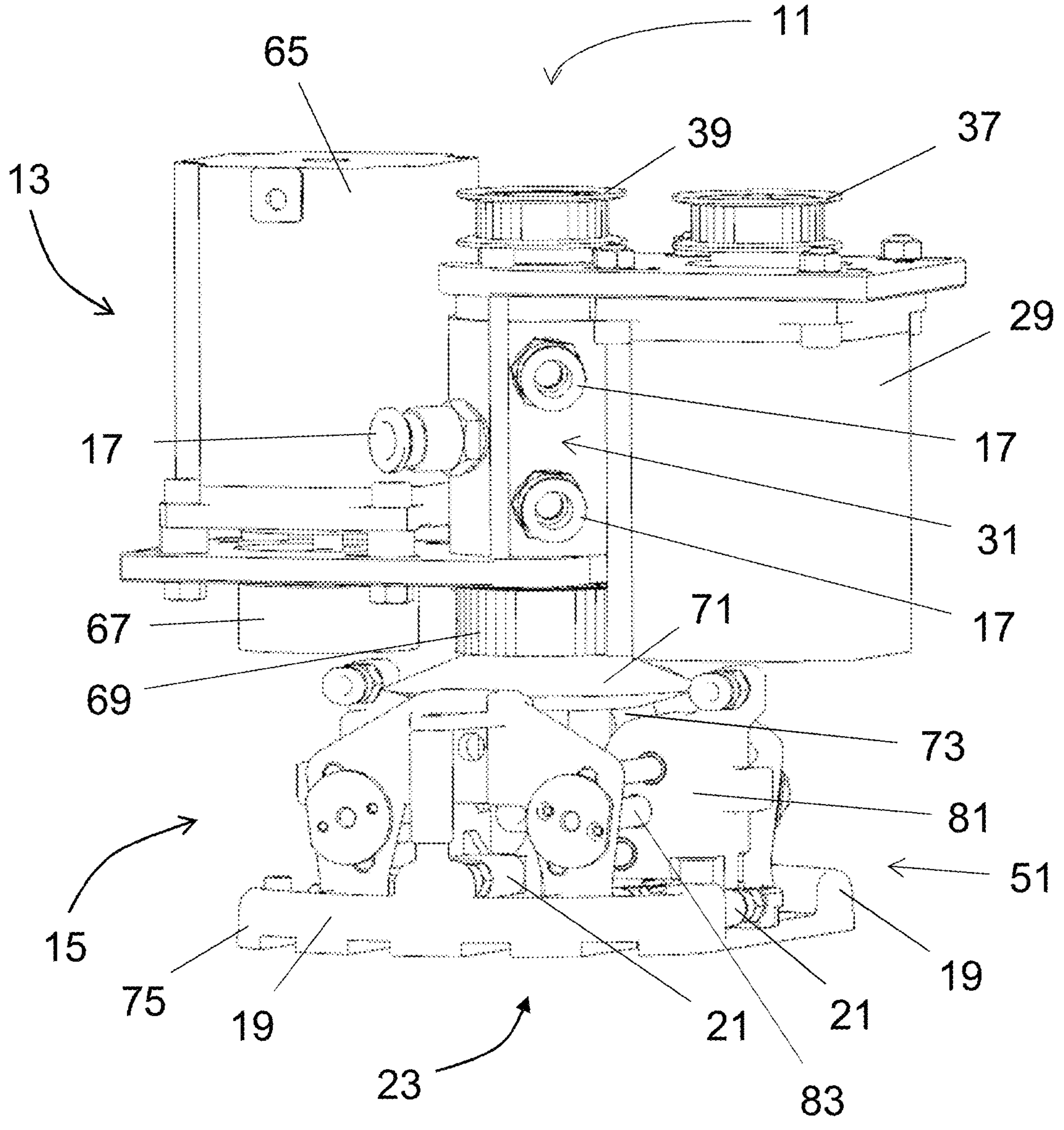

| | | | | |
|---|---|---|---|---|
| 9,802,728 | B1 * | 10/2017 | Rodgers | B65C 9/02 |
| 10,407,201 | B1 | 9/2019 | Rodgers et al. | |
| 2018/0305062 | A1 | 10/2018 | Wolff | |

FOREIGN PATENT DOCUMENTS

| | | | |
|---|---|---|---|
| DE | 10 2011 012 919 | A1 | 9/2012 |
| DE | 10 2015 106 647 | A1 | 11/2016 |
| EP | 3 288 836 | A1 | 3/2018 |
| EP | 3 271 254 | B1 | 9/2018 |
| WO | 2016/173742 | A1 | 11/2016 |
| WO | WO-2020116575 | A1 * | 6/2020 |

OTHER PUBLICATIONS

European Search Report dated Sep. 19, 2023 in related European Application No. 23178314.3 (thirteen pages).

* cited by examiner

BLOW LABELER

This application claims priority to European Patent Application No. 21179819.4 filed Jun. 16, 2021, the disclosure of which is incorporated by reference herein.

The invention relates to a blow labeler for applying labels to packages.

Labelers are used in price labeling systems that are used for the weight-variable price labeling and goods labeling in retail, trade, and in industrial operations. In this respect, the weight of the packages is determined on the transport via a weighing belt by a load cell on which the weighing belt is supported and a corresponding label having the weight and an associated price is subsequently printed by the labeler and the package is provided with the corresponding label.

In the case of a stamp labeler, the labels are mechanically stamped onto the packages by means of a stamp head. However, the packages can hereby be damaged, depending on the design. In the case of a blow labeler, the labels are, in contrast, blown off contactlessly in the direction of the packages so that damage can be avoided. Furthermore, uneven packages can also be labeled by a blow labeler.

A blow labeler is known from the document DE 10 2015 106 647 A1, comprising a blower head that has a label contact surface that is passed through by suction openings and blow-off openings, wherein the labels are held at the label contact surface by suction air and are blown off from the label contact surface by compressed air. In this respect, provision is made that the labels can be rotated before they are transferred to the packages so that the labels can be oriented relative to the packages in the direction of rotation. For this purpose, a part of the label contact surface is formed as a ring-shaped region comprising suction openings. To rotate a label held at the label contact surface, the ring-shaped region comprising the label sucked on thereat is extended from the rest of the label contact surface, is rotated, and is finally retracted again before the label is then blown off in the direction of the respective package in a position changed by the rotation. However, the retraction and extension of the ring-shaped region takes time and thus restricts the throughput of the blow labeler.

The invention is based on the object of providing a possibility of aligning labels and packages with one another in the direction of rotation, wherein a high throughput can simultaneously be ensured on the application of the labels to the packages.

This object is satisfied by a blow labeler having the features of claim 1, and in particular by a blow labeler for applying labels to packages, comprising a blower head having base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface.

The blower head therefore comprises a base platform and a holding platform that is rotatable relative thereto and that has the label contact surface having the blow-off openings and suction openings of the blower head. The ports for the compressed air and the suction air for the blow-off openings and the suction openings and the electric motor for rotating the holding platform are provided at the base platform. In contrast to the blow labeler known from the prior art, in the blow labeler in accordance with the invention not only a part of the label contact surface comprising only some suction openings is rotated, but the total label contact surface with all its blow-off openings and suction openings is rotated. An additional retraction and extension of the labels, as is necessary with the blow labeler known from the prior art, can hereby be omitted so that a high throughput can be achieved on the application of the labels to the packages. The wording "having a compressed air port" in this respect does not preclude more than one compressed air port from being provided.

In this respect, provision can be made that the holding platform is rotatable in both directions of rotation. The holding platform can in particular be rotatable from a starting position in the one direction of rotation and in the other direction of rotation and/or can be rotated out of a starting position in one direction of rotation and rotated back into the starting position against the one direction of rotation. Additionally or alternatively, provision can be made that the holding platform is rotatable without restriction, i.e. that no abutment is provided for the rotation, but that the holding platform can be rotated continuously in at least one of the two directions of rotation.

In accordance with a preferred embodiment, the holding platform comprises a multi-passage rotary union to realize a sealed transition for the compressed air and the suction air between the base platform and the holding platform that is rotatable relative to the base platform. With the rotary union, it can be achieved in a simple and reliable manner to realize the rotatable support of the holding platform at the base platform, wherein the supply of the blow-off openings and suction openings with compressed air and suction air is simultaneously ensured. The number of passages of the rotary union preferably corresponds to the number of ports of the base platform. The rotary union can generally have axial and/or radial interfaces for transferring the compressed air and the suction air. The rotary union can in particular comprise an outer cylinder and an inner cylinder that is rotatable relative to the outer cylinder by the drive, with the holding platform being rotationally and axially fixedly held at the inner cylinder.

Specifically, a number of ring passages sealed off from one another corresponding to the number of ports can be formed between the outer cylinder and the inner cylinder, with one of the ports being connected to each ring passage in a radial direction via an associated opening in the outer cylinder and an associated compressed air or suction air passage being connected to each ring passage in an axial direction via an associated opening in the inner cylinder, with a compressed air passage and at least one suction air passage being provided that, within the inner cylinder, extend next to one another and towards the same axial end of the inner cylinder. The other axial end of the inner cylinder can thus be kept free of ports so that the drive can engage in an impediment-free manner at this end of the rotary union. The wording "a compressed air passage" again does not preclude more than one compressed air passage from being provided. In addition to the aforementioned ring passages, the rotary union can generally have one or more further ring passages with which no ports are associated, however, or which are not used.

The holding platform preferably comprises a compressed air and suction air line system that connects the blow-off openings and the suction openings to the rotary union, in particular to the aforesaid compressed air passage and the aforesaid at least one suction air passage. The compressed air and suction air line system can be branched multiple times to connect all the blow-off openings and all the suction openings to the compressed air passage or the at least one suction air passage.

The holding platform preferably has an air connection stub that projects in the direction of the base platform, that forms a common interface of the compressed air and suction air line system to the rotary union, and that, on a rotation of the inner cylinder, is taken along by a coupling section that is formed in a counter-shape and that is molded to an end of the inner cylinder facing the holding platform. The compressed air and suction air line system of the holding platform, on the one hand, and the rotary union of the base platform, on the other hand, can hereby be mechanically and fluidically connected to one another in a simple manner. Provision can in particular be made that the coupling section has a receiver that engages over the air connection stub.

The drive can comprise a belt drive that is connected downstream of the electric motor and that has a drive pulley and a driven pulley, with the rotatable inner cylinder being rotationally fixedly connected to the driven pulley. With the aid of the belt drive, a torque can be transmitted in a simple and maintenance-free manner from the electric motor to the inner cylinder. Furthermore, an elastic force transmission is ensured that has a shock-absorbing and vibration-absorbing effect.

In accordance with a further preferred embodiment, the label contact surface comprises a first contact region and a second contact region that is linearly displaceable with respect to the first contact region in a plane of the label contact surface, with the suction openings at least being formed in the second contact region, and with the base platform having a further electric motor that is part of a further drive that is adapted to drive the second contact region in a linearly displaceable manner in order to linearly move a label held at the second contact region. The labels to be applied to the packages can therefore not only be rotated, but also linearly displaced before the blowing off so that not only the orientation of the labels on the packages can be influenced, but also their position. Furthermore, to take over the labels, the second contact region can be displaced in the direction of a label feed device of the blow labeler, in particular a printer comprising a label dispensing edge, in order to simplify the transfer of the labels from the label feed device to the blower head or to make it more secure.

Provision can in particular be made that only suction openings are formed in the second contact region. The blow-off openings are then only formed in the first contact region. Both suction openings and blow-off openings can be formed in the first contact region. Provision can be made that the suction openings of the first contact region and the second contact region are acted on by suction air in an alternating manner, in particular that the labels are transferred from the second contact region to the first contact region. The blowing off of the labels can take place through the blow-off openings of the first contact region.

The suction openings are preferably formed both in the second contact region and in the first contact region, with the blow labeler being adapted to apply suction air only to the suction openings of the second contact region on a displacement of the second contact region. An action on the suction openings of the first contact region would be an obstacle on the movement of the labels and therefore preferably does not take place.

In accordance with a further preferred embodiment, provision is made that the blow labeler is adapted to displace the second contact region from a starting position into a takeover position during operation in order to take over a label in the takeover position, to displace the second contact region with the taken-over label from the takeover position back into the starting position, with only the suction openings of the second contact region being acted on by suction air during the displacement back, and, after the displacement back, to apply suction air only to the suction openings of the first contact region and subsequently to blow off the label. The second contact region can then already be displaced into the takeover position for the next label again, while the holding platform is still rotated into the correct orientation for the current label. The throughput can thereby be increased again on the application of the labels to the packages.

The at least one suction air port preferably comprises a first suction air port and a second suction air port, with the suction openings of the first holding region being in fluid communication with the first suction air port and the suction openings of the second holding region being in fluid communication with the second suction air port. This makes it possible in a simple manner to apply suction air to the first contact region and the second contact region separately from one another, in particular in an alternating manner.

The first contact region and the second contact region can each be formed by a plurality of contact strips that are all directed the same, with the contact strips of the first contact region and the contact strips of the second contact region being arranged alternately next to one another. Both the first contact region and the second contact region can thereby in each case apply suction air over as large an area as possible to a label held at the label contact surface. This is in particular of advantage in the case of an alternating application. Provision can in particular be made that the contact strips of the second contact region are shorter than the contact strips of the first contact region. In the aforementioned takeover position, the contact strips of the second contact region can end flush with the contact strips of the first contact region.

In accordance with a further preferred embodiment, the holding platform comprises a base body having the first contact region and a slide arrangement having the second contact region, with the slide arrangement being linearly drivable via a drive shaft that is rotatably supported at the base body and that is part of the further drive. The displaceability of the second contact region can hereby be achieved in a simple and reliable manner. The base body can in this respect comprise two retaining brackets which project in the direction of the base platform and at which the slide arrangement is supported.

The slide arrangement can comprise two slides that can be displaced in parallel with and synchronously to one another, with each slide supporting one of two parts of the second contact region. The two slides can be arranged at mutually oppositely disposed sides of the aforementioned rotary union, whereby a certain symmetry can be achieved that enables a balanced rotation of the holding platform and a balanced displacement of the second contact region.

The holding platform can comprise two threaded spindles, with the two slides each being configured as a spindle nut and each being threaded on one of the two threaded spindles, with a rotation of the two threaded spindles causing a displacement of the two slides. An exact displacement of the two slides is hereby made possible in a simple manner. The holding platform can, for each slide, have at least one guide rod along which the respective slide is displaceably guided.

The two slides can hereby be kept particularly stable on the displacement. The guide rods are in particular supported at the two retaining brackets.

The holding platform preferably has a multi-drive belt drive that is part of the further drive, with the two threaded spindles being drive-effectively connected to the drive shaft via the multi-drive belt drive. A coupling between the drive shaft, on the one hand, and the two threaded spindles, on the other hand, can be achieved in a simple manner by means of a multi-drive belt drive.

The base platform preferably comprises a further belt drive that is connected downstream of the further electric motor and that has a further drive pulley and a further driven pulley, which further belt drive is part of the further drive, with the further driven pulley being supported at the rotatable inner cylinder, in particular via a ball bearing. With the aid of the further belt drive, a torque can be transmitted from the further electric motor in a simple and maintenance-free manner. Furthermore, an elastic force transmission is ensured that has a shock-absorbing and vibration-absorbing effect.

Furthermore, it is preferred for the further drive to have a bevel gear that is connected downstream of the further belt drive and that has a ring gear and a pinion, with the ring gear being supported, in particular slidingly supported, at the rotatable inner cylinder and being rotationally fixedly connected to the further driven pulley, and with the pinion being rotatably supported at the base body and being rotationally fixedly connected to the drive shaft. The electric motor and the further electric motor each have a driven shaft, said driven shafts preferably being aligned in parallel with one another, in particular in the sense of a particularly compact design of the blower head. With a bevel gear, a rotational movement in parallel with the axis of rotation of the holding platform can be converted in a simple manner into a rotational movement transverse, in particular perpendicular, to the axis of rotation of the holding platform. The further electric motor of the further drive can thereby be fastened to the base platform and is not also moved with the rotation of the holding platform. The weight of the further electric motor thus does not contribute to the inertia of the holding platform.

The blow labeler is preferably adapted to control the further electric motor such that a displacement of the second contact region caused by a rotation of the inner cylinder is compensated. Depending on the design of the further drive, a rotation of the holding platform can result in a displacement of the second contact region. This can be counteracted by a corresponding counter control by means of the further drive. If it is intended to displace the second contact region simultaneously with a rotation of the holding platform, the displacement of the second contact region caused by the rotation of the inner cylinder is taken into account accordingly on the control of the further electric motor in order to achieve the desired displacement of the second contact region.

The invention further relates to a price labeling system for automatically weighing and labeling packages comprising a blow labeler such as described above and a transport apparatus, including a weighing belt to weigh the packages and to guide them past the blow labeler.

In accordance with a preferred embodiment, the price labeling system comprises a camera, which is arranged upstream of the blow labeler in a transport direction, to detect a rotational position of a respective package, and a control unit that is connected to the camera and the blow labeler and that is adapted to control the electric motor of the drive of the blow labeler in dependence on the detected rotational position of the respective package.

The packages are typically guided past the blow labeler in an aligned manner. However, the actual orientation of a package can be rotated just by 90° with respect to the desired orientation, i.e. a package that is desired to be longitudinally oriented arrives oriented transversely at the blow labeler, or vice versa. This can be recognized by the camera and the label to be applied to this package can accordingly be rotated by 90° to apply the label with the correct orientation to the package.

Furthermore, it can also occur that individual packages can move past the blow labeler in an unaligned manner, i.e. they are rotated, in particular by a few degrees, with respect to a longitudinal or transverse orientation. Such a rotation can also be detected by the camera and can be compensated by a corresponding rotation of the label to be applied so that the label can be applied to the package with a correct orientation despite the rotated package.

Further advantageous embodiments of the invention are described in the dependent claims, in the description of the Figures, and in the drawing.

Figure 2:
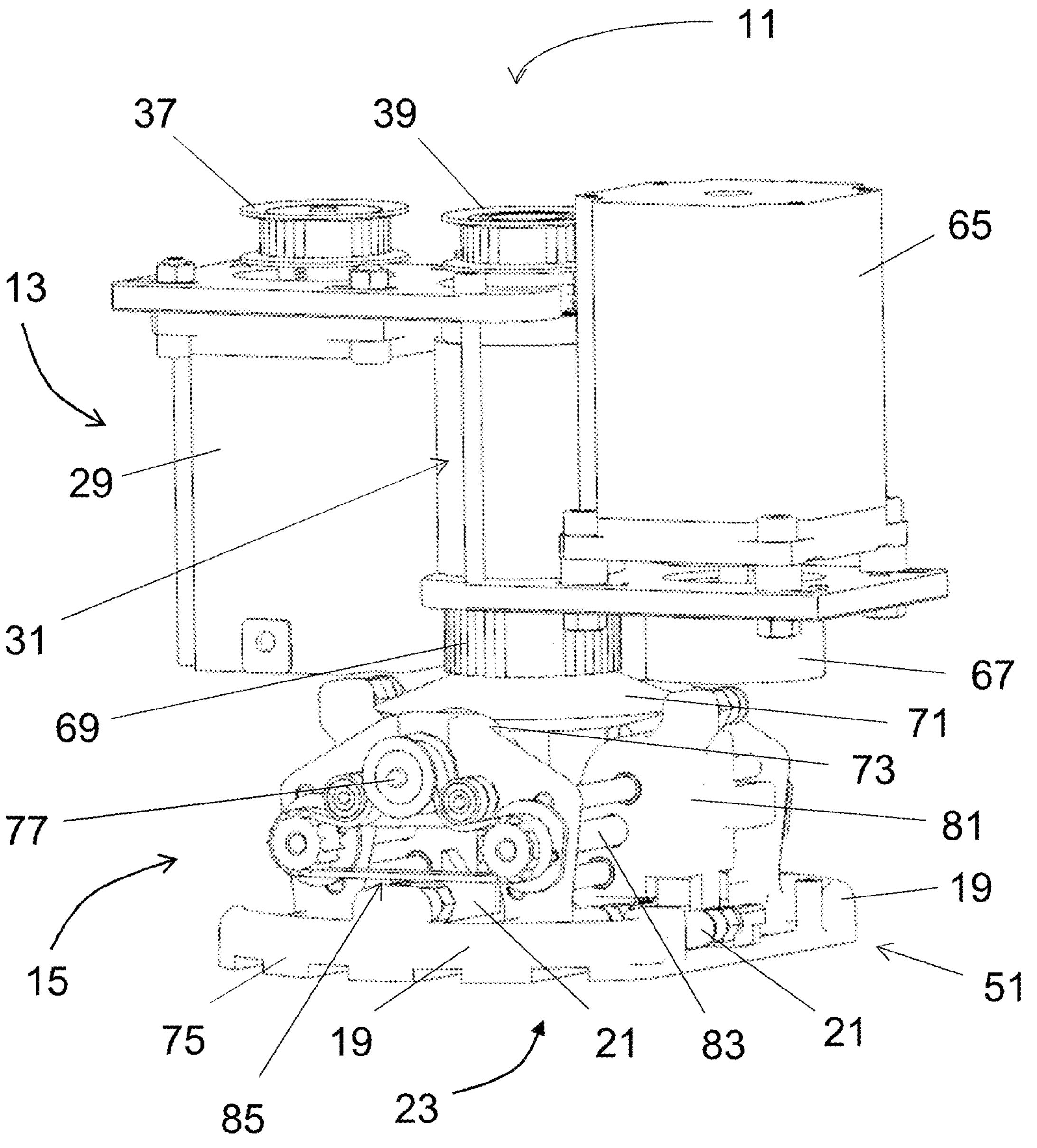
Figure 3:
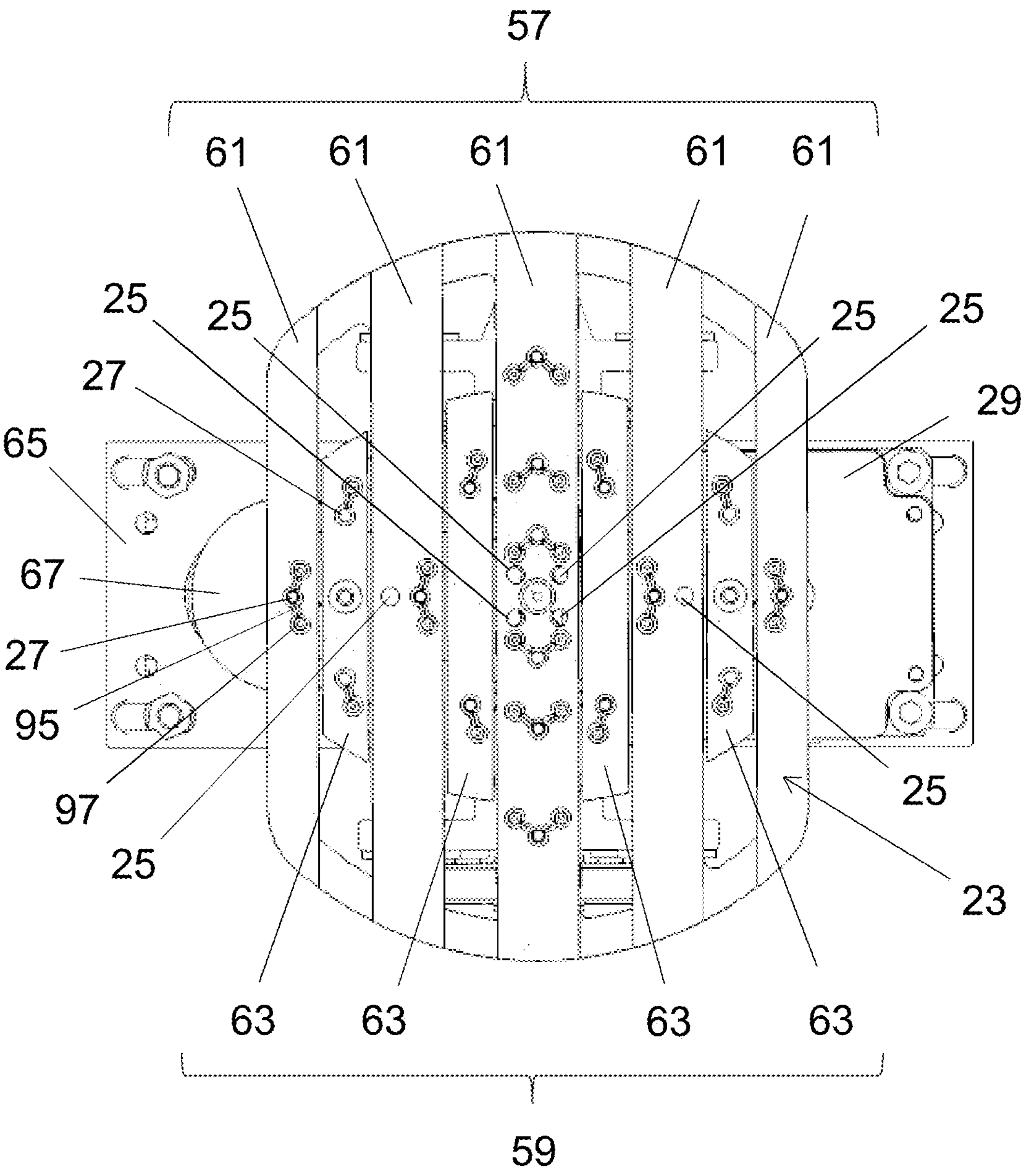
Figure 4:
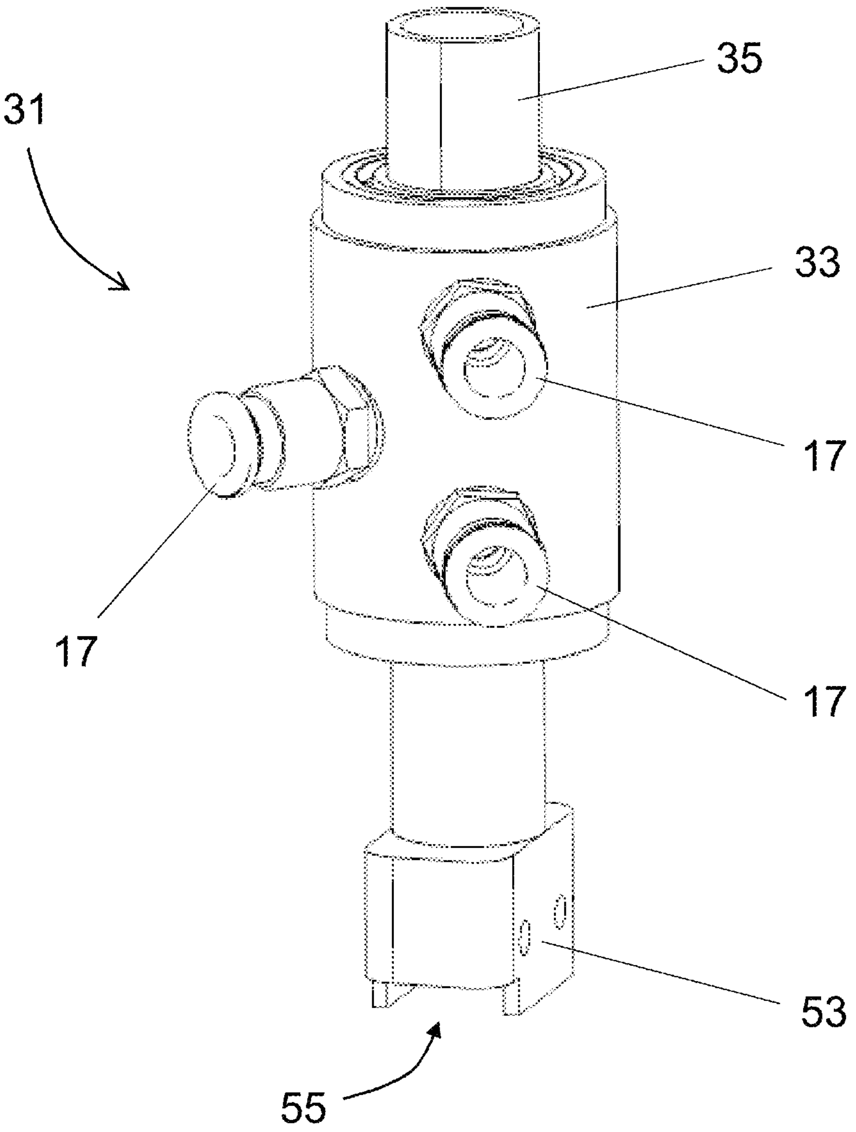
Figure 5:
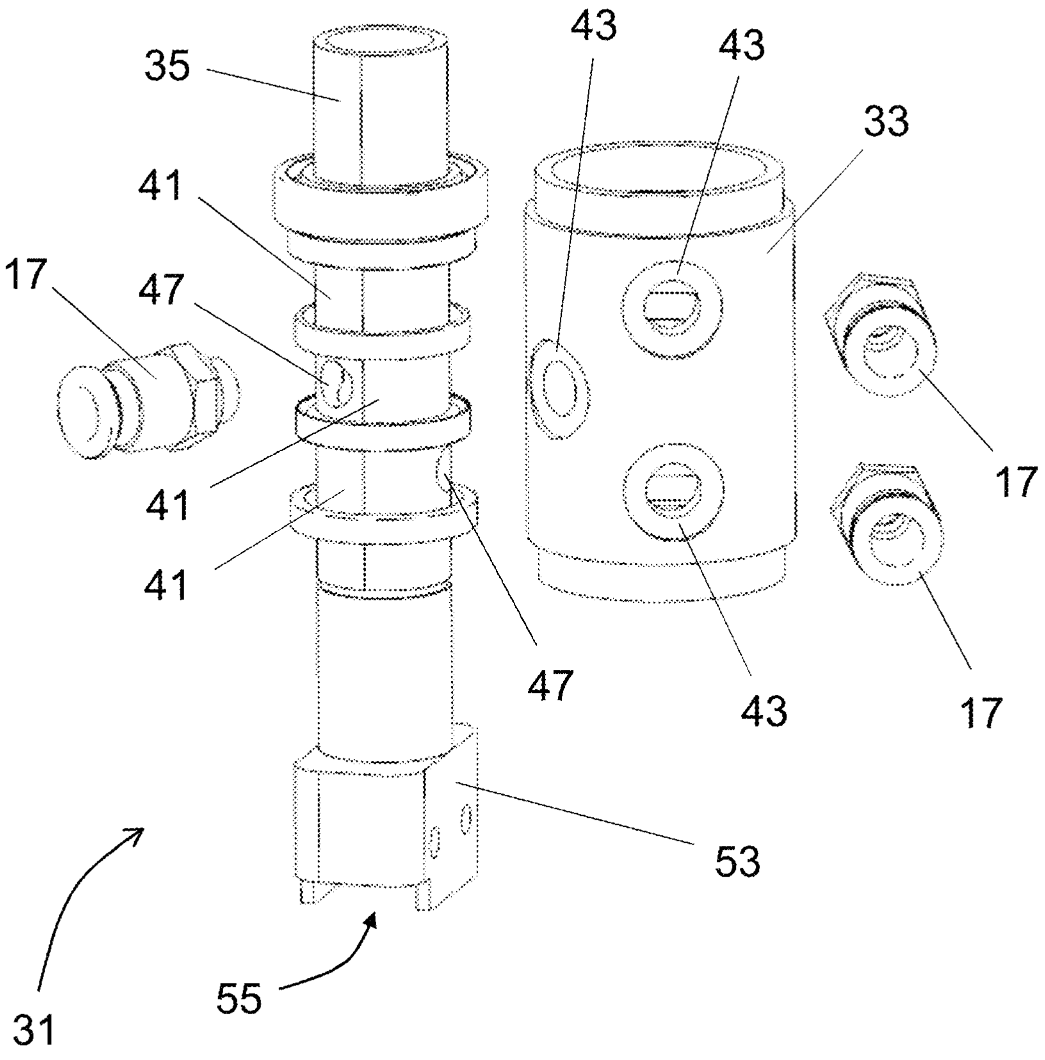
Figure 6:
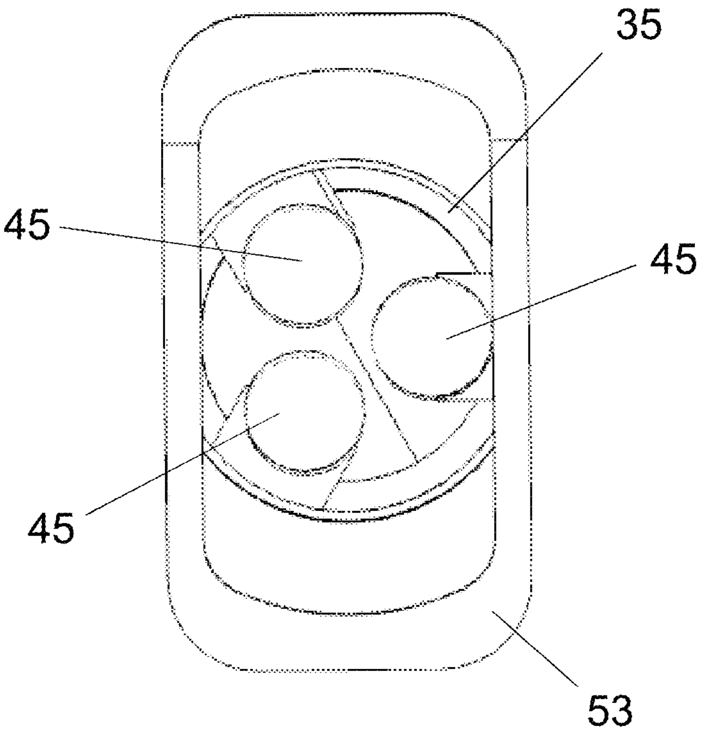

The invention will be described in the following by way of example with reference to the drawing. There are shown FIG. 1 a perspective front view of a blower head of a blow labeler in accordance with the invention comprising a base platform having a rotary union and a holding platform having a base body;

FIG. 2 a perspective rear view of the blower head of FIG. 1;

FIG. 3 the blower head of FIG. 1 in a view from below;

FIG. 4 the rotary union in accordance with FIG. 1 in an individual representation;

FIG. 5 the rotary union of FIG. 4 in an exploded representation;

FIG. 6 an inner cylinder of the rotary union of FIG. 4 from below; and

Figure 7:
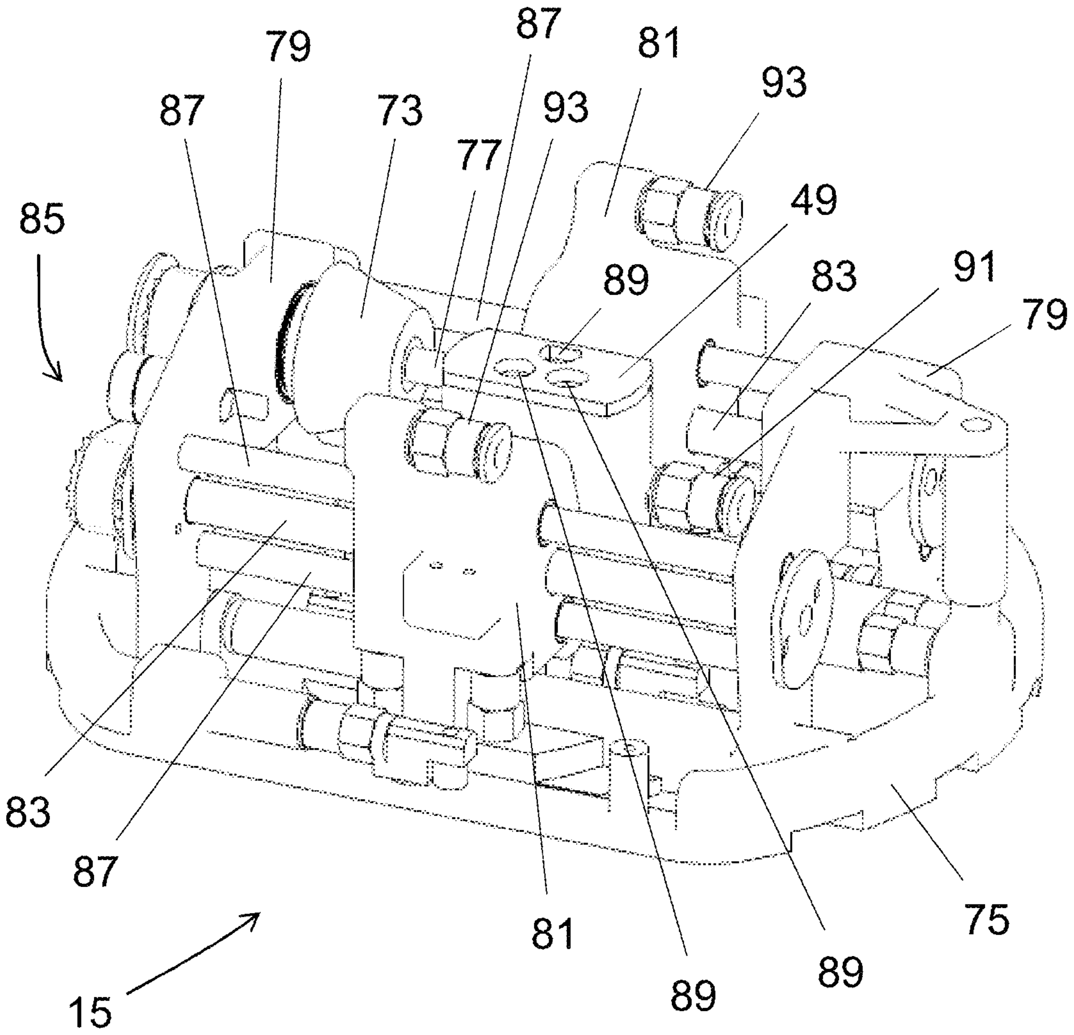

FIG. 7 the holding platform of FIG. 1 in a perspective view.

In FIGS. 1 and 2, a blower head 11 of a blow labeler in accordance with the invention for applying labels to packages is shown. The blow labeler is part of a price labeling system for the automatic weighing and labeling of packages. In addition to the blow labeler, the price labeling system comprises a transport apparatus, including a weighing belt to weigh the packages and to guide them past the blow labeler.

The blower head 11 comprises a base platform 13 and a holding platform 15. The base platform 13 comprises an air connection device having a compressed air port 17 (in FIG. 1, middle left) as well as a first suction air port 17 (in FIG. 1, top right) and a second suction air port 17 (in FIG. 1, bottom right). The compressed air port 17 is connected to a compressed air generator and the two suction air ports 17 are connected to a suction air generator or vacuum generator, wherein the two suction air ports can be acted on by suction air or vacuum independently of one another. At the lower side of the holding platform, a label contact surface 23 is formed at which the labels can first be held via suction air and can then be blown off onto a package via compressed air. For this purpose, a plurality of blow-off openings 25 in fluid communication with the compressed air port 17 and a plurality of suction openings 27 in fluid communication with the two suction air ports 17 are provided in the label contact surface 23, as can be seen in FIG. 3. All the blow-off openings 25 are provided with a reference numeral. For reasons of clarity, only some of the suction openings 27 are provided with a reference numeral, however. The effective surface of the suction openings 27 is increased by grooves 95 and circular recesses 97 formed in the label contact surface 23. No further blow-off or suction openings are provided.

To be able to rotate the labels after their takeover by a label feed device of the blow labeler, the holding platform 15 is rotatably supported at the base platform 13. This makes it possible to orient the labels relative to the packages in the direction of rotation. For this purpose, the base platform 13 has a drive comprising an electric motor 29. To be able to forward the compressed air and suction air available at the compressed air port 17 and at the two suction air ports 17 from the stationary base platform 13 to the rotatable holding platform 15 comprising the blow-off and suction openings 25, 27, the air connection device has a multi-passage rotary union 31 (cf. FIGS. 4 to 6). The rotary union 31 comprises a stationary outer cylinder 33 and a rotatable inner cylinder 35 at whose lower end the holding platform 15 is fastened. At its upper end, the inner cylinder 35 is coupled to a driven pulley 39 that belongs to a toothed belt drive that is connected downstream of the electric motor 29 and whose drive pulley 37 is driven by the motor shaft of the electric motor 29. The belt of the toothed belt drive is not shown for the sake of a better recognizability of the other components.

Three ring passages 41 sealed off with respect to one another are formed between the outer cylinder 33 and the inner cylinder 35 and a compressed air passage 45 associated with the compressed air port 17, a first suction air passage 45 associated with the first suction air port 17, and a second suction air passage 45 associated with the second suction air port 17 are formed within the inner cylinder 35. The ring passages 41 are fluidly connected in the radial direction to one of the three ports 17, in each case via an associated opening 43 formed in the outer cylinder 33, and are fluidically connected in the axial direction to one of the three passages 45, in each case via an associated opening 47 which is formed in the inner cylinder 35 and of which only two are visible. The passages 45 are disposed next to one another and extend towards the lower end of the inner cylinder 35. Due to this design of the rotary union 31, the holding platform 15 is rotatable in both directions of rotation and without restriction, i.e. without an abutment.

To connect the blow-off openings 25 to the compressed air passage 45 and the suction openings 27 to the two suction air passages 45, the holding platform 15 comprises an air connection stub 49 (cf. FIG. 7) that projects in the direction of the base platform 13 and that forms a common interface of a compressed air and suction air line system 51 of the holding platform 15 to the rotary union 31. At its lower end, the inner cylinder 35 has a molded-on coupling section 53 comprising a receiver 55 that is formed in a counter-shape to the air connection stub 49, that engages over the air connection stub 49, and that takes along the air connection stub 49 on a rotation of the inner cylinder 35 so that the holding platform 15 is rotated accordingly. The passages 45 in this respect dip into receiving openings 89 which are formed in the air connection stub 49 and from which the compressed air and suction air line system 51 extends to the blow-off and suction openings 25, 27. The compressed air and suction air line system 51 is designed such that the lines associated with the compressed air passage 45, the lines associated with the first suction air passage 45, and the lines associated with the second suction air passage 45 extend separately from one another.

As can be seen from FIG. 3, the label contact surface 23 is divided into a first contact region 57 and a second contact region 59, with the second contact region 59 being linearly displaceable with respect to the first contact region 57 in the plane of the label contact surface 23, as will be explained in further detail below, in order to linearly move a label held at the second contact region 59. The position of the labels on the packages can hereby be adapted. Furthermore, the labels can be picked up from the label feed device by the displaceable second contact region 59.

Both the first contact region 57 and the second contact region 59 of the label contact surface 23 are each formed by a plurality of contact strips 61, 63. All of the contact strips 61, 63 are directed the same, with the contact strips 61, 63 of the first and second contact regions 57, 59 being arranged alternately next to one another. As can be seen from FIG. 3, the contact strips 63 of the second contact region 59 are shorter than the contact strips 61 of the first contact region 57. Both suction openings 27 and blow-off openings 25 are formed in the first contact region 57; only suction openings 27 are formed in the second contact region 59. In this respect, the suction openings 27 of the first contact region 57 are connected to the first suction air port 17 and the suction openings 27 of the second contact region 59 are connected to the second suction air port 17. Provision is in particular made that only the suction openings 27 of the second contact region 59 are acted on by suction air when the second contact region 59 is displaced.

This enables an operation of the blow labeler in which the contact strips 63 of the second contact region 59 are moved from the starting position shown in FIG. 3 into a takeover position, not shown, in which they end flush with the contact strips 61 of the first contact region 57 in order to take over a label from the label feed device. Subsequently, the contact strips 63 of the second contact region 59 are displaced back into the starting position, wherein only the suction openings 27 of the second contact region 59 are acted on by suction air during the displacement back. After the displacement back, the second contact region 59 transfers the label to the first contact region 57 by deactivating the suction openings 27 of the second contact region 59 and activating the suction openings 27 of the first contact region 57. The label can then be blown off through the blow-off openings 25 of the first contact region 57. The transfer of the label from the second contact region 59 to the first contact region 57 makes it possible that the second contact region 59 can already be displaced back into the takeover position to pick up the next label, while the holding platform 15 is still rotated into the correct orientation for the current label.

To displace the second contact region 59, the base platform 13 has a further drive comprising a further electric motor 65. A further toothed belt drive comprising a further drive pulley 67 and a further driven pulley 69, which are supported at the rotatable inner cylinder 35 via a ball bearing, is connected downstream of the further electric motor 65. The belt of the further toothed belt drive is not shown for the sake of a better recognizability of the remaining components and the further drive pulley 67 is toothed contrary to the representation. A bevel gear comprising a ring gear 71 and a pinion 73 is in turn connected downstream of the further toothed belt drive. The ring gear 71 is rotationally fixedly connected to the further driven pulley 69 and is slidingly supported at the rotatable inner cylinder 35 and the pinion 73 and a drive shaft 77 rotationally fixedly connected to the pinion 73 are each rotatably supported at a base body 75 of the holding platform 15.

The first contact region 57 is formed at the lower side of the base body 75. To connect the suction openings 27 of the contact strips 61 of the first contact region 57 to the compressed air passage 45 and the first suction air passage 45, the compressed air and suction air line system 51 is partly configured as tubes 19 integrated in the base body 75 of the holding platform 15 and partly as pipeline sections 21 arranged at the upper side on the base body 75.

Furthermore, the base body 75 has two retaining brackets 79 which project in the direction of the base platform 13 and at which a slide arrangement is supported that can be driven by the drive shaft 77, wherein the second contact region 59 is formed at the lower side of the slide arrangement. The slide arrangement is formed by two slides 81 that can be displaced in parallel with and synchronously to one another. Each of the two slides 81 supports two of the contact strips 63 of the second contact region 59.

The two slides 81 are each configured as a spindle nut and are each threaded on a threaded spindle 83. The two threaded spindles 83 are driven by the drive shaft 77 via a multi-drive belt drive 85. A rotation of the two threaded spindles 83 results in a displacement of the two slides 81 and thus of the second contact region 59. The two slides 81 are in this respect each guided along two guide rods 87 that are supported by the two retaining brackets 79.

To connect the suction openings 27 of the contact strips 63 of the slides 81 to the second suction air passage 45 or the second suction air port 17, the compressed air and suction air line system 51 has an outlet 91 that laterally leads off from the air connection stub 49 and that is connected to a respective inlet 93 of the two slides 81 via a pipeline hose, not shown, branched in a T shape.

Since the pinion 73 moves with respect to the ring gear 71 on a rotation of the holding platform 15, the second contact region 59 would also be automatically displaced on a rotation of the holding platform 15. This is prevented in that the further electric motor 65 is controlled such that a displacement of the second contact region 59 caused by a rotation of the inner cylinder 35 is compensated. If the holding platform 15 is to be rotated and the second contact region 59 is to be displaced at the same time, this is taken into account accordingly.

REFERENCE NUMERAL LIST

11 blower head
13 base platform
15 holding platform
17 compressed air port or suction air port
19 tube
21 pipeline section
23 label contact surface
25 blow-off opening
27 suction opening
29 electric motor
31 rotary union
33 outer cylinder
35 inner cylinder
37 drive pulley
39 driven pulley
41 ring passage
43 opening
45 compressed air or suction air passage
47 opening
49 air connection stub
51 compressed air and suction air line system
53 coupling section
55 receiver
57 first contact region
59 second contact region
61 contact strip
63 contact strip
65 further electric motor
67 further drive pulley
69 further driven pulley
71 ring gear
73 pinion
75 base body
77 drive shaft
79 retaining bracket
81 slide
83 threaded spindle
85 multi-drive belt drive
87 guide rod
89 reception opening
91 outlet
93 inlet
95 groove
97 recess

The invention claimed is:

1. A blow labeler for applying labels to packages, comprising a blower head having a base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface, wherein the air connection device has a multi-passage rotary union to realize a sealed transition for the compressed air and the suction air between the base platform and the holding platform that is rotatable relative to the base platform.

2. The blow labeler in accordance with claim 1, wherein the holding platform is rotatable in both directions of rotation and/or is rotatable without restriction.

3. The blow labeler in accordance with claim 1, wherein the rotary union comprises an outer cylinder and an inner cylinder that is rotatable relative to the outer cylinder by the drive, with the holding platform being rotationally and axially fixedly held at the inner cylinder.

4. The blow labeler in accordance with claim 3, wherein a number of ring passages sealed off from one another corresponding to the plurality of ports is formed between the outer cylinder and the inner cylinder, with one of the ports being connected to each ring passage in a radial direction via an associated opening in the outer cylinder and an associated compressed air or suction air passage being connected to each ring passage in an axial direction via an associated opening in the inner cylinder, with a compressed air passage and at least one suction air passage being provided that, within the inner cylinder, extend next to one another and towards a same axial end of the inner cylinder.

5. The blow labeler in accordance with claim 3, wherein the drive comprises a belt drive that is connected downstream of the electric motor and that has a drive pulley and a driven pulley, with the rotatable inner cylinder being rotationally fixedly connected to the driven pulley.

6. The blow labeler in accordance with claim 1, wherein the holding platform comprises a compressed air and suction air line system that connects the blow-off openings and the suction openings to the rotary union.

7. The blow labeler in accordance with claim 6, wherein the rotary union comprises an outer cylinder and an inner cylinder that is rotatable relative to the outer cylinder by the drive, and wherein the holding platform has an air connection stub that projects in the direction of the base platform, that forms a common interface of the compressed air and suction air line system to the rotary union, and that, on a rotation of the inner cylinder, is taken along by a coupling section that is formed in a counter-shape and that is molded to an end of the inner cylinder facing the holding platform.

8. The blow labeler in accordance with claim 7, wherein the coupling section has a receiver that engages over the air connection stub.

9. The blow labeler in accordance with claim 1, the holding platform comprises a compressed air and suction air line system that connects the blow-off openings and the suction openings to a compressed air passage and to at least one suction air passage.

10. A blow labeler for applying labels to packages, comprising a blower head having a base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface, wherein the label contact surface comprises a first contact region and a second contact region that is linearly displaceable with respect to the first contact region in a plane of the label contact surface, with the suction openings at least being formed in the second contact region, and with the base platform having a further electric motor that is part of a further drive that is adapted to drive the second contact region in a linearly displaceable manner in order to linearly move a label held at the second contact region.

11. The blow labeler in accordance with claim 10, wherein only suction openings are formed in the second contact region and/or both suction openings and blow-off openings are formed in the first contact region.

12. The blow labeler in accordance with claim 10, wherein the suction openings are formed both in the second contact region and in the first contact region, with the blow labeler being adapted to apply suction air only to the suction openings of the second contact region on a displacement of the second contact region.

13. The blow labeler in accordance claim 10, wherein the blow labeler is adapted to displace the second contact region from a starting position into a takeover position during operation in order to take over a label in the takeover position, to displace the second contact region with the taken-over label from the takeover position back into the starting position, with only the suction openings of the second contact region being acted on by suction air during the displacement back, and, after the displacement back, to apply suction air only to the suction openings of the first contact region and subsequently to blow off the label.

14. The blow labeler in accordance with claim 10, wherein the at least one suction air port comprises a first suction air port and a second suction air port, with the suction openings of the first contact region being in fluid communication with the first suction air port and the suction openings of the second contact region being in fluid communication with the second suction air port.

15. The blow labeler in accordance with claim 10, wherein the first contact region and the second contact region are each formed by a plurality of contact strips that are all directed the same, with the contact strips of the first contact region and the contact strips of the second contact region being arranged alternately next to one another.

16. The blow labeler in accordance with claim 10, wherein the holding platform comprises a base body having the first contact region and a slide arrangement having the second contact region, with the slide arrangement being linearly drivable via a drive shaft that is rotatably supported at the base body and that is part of the further drive.

17. The blow labeler in accordance with claim 16, wherein the slide arrangement comprises two slides that can be displaced in parallel with and synchronously to one another, with each slide supporting one of two parts of the second contact region.

18. The blow labeler in accordance with claim 17, wherein the holding platform comprises two threaded spindles, with the two slides each being configured as a spindle nut and each being threaded on one of the two threaded spindles, with a rotation of the two threaded spindles causing a displacement of the two slides.

19. The blow labeler in accordance with claim 18, wherein the holding platform has a multi-drive belt drive that is part of the further drive, with the two threaded spindles being drive-effectively connected to the drive shaft via the multi-drive belt drive.

20. The blow labeler in accordance with claim 17, wherein the holding platform has, for each slide, at least one guide rod.

21. The blow labeler in accordance with claim 17, wherein the holding platform has, for each slide, at least one guide rod supported at the two retaining brackets and along which the respective slide is displaceably guided.

22. The blow labeler in accordance with claim 10, wherein the air connection device has a multi-passage rotary union to realize a sealed transition for the compressed air and the suction air between the base platform and the holding platform that is rotatable relative to the base platform, with provision being made that the rotary union comprises an outer cylinder and an inner cylinder that is rotatable relative to the outer cylinder by the drive, with the holding platform being rotationally and axially fixedly held at the inner cylinder, and the base platform comprises a further belt drive that is connected downstream of the further electric motor and that has a further drive pulley and a further driven pulley, which further belt drive is part of the further drive, with the further driven pulley being supported at the rotatable inner cylinder.

23. The blow labeler in accordance with claim 22, wherein the holding platform comprises a base body having the first contact region and a slide arrangement having the second contact region, with the slide arrangement being linearly drivable via a drive shaft that is rotatably supported at the base body and that is part of the further drive, and the further drive has a bevel gear that is connected downstream of the further belt drive and that has a ring gear and a pinion, with the ring gear being supported at the rotatable inner cylinder and being rotationally fixedly connected to the further driven pulley, and with the pinion being rotatably supported at the base body and being rotationally fixedly connected to the drive shaft.

24. The blow labeler in accordance with claim 22, wherein the blow labeler is adapted to control the further electric motor such that a displacement of the second contact region caused by a rotation of the inner cylinder is compensated.

25. The blow labeler in accordance with claim 22, wherein the holding platform comprises a base body having the first contact region and a slide arrangement having the second contact region, with the slide arrangement being linearly drivable via a drive shaft that is rotatably supported at the base body and that is part of the further drive, and the further drive has a bevel gear that is connected downstream of the further belt drive and that has a ring gear and a pinion, with the ring gear being slidingly supported at the rotatable inner cylinder and being rotationally fixedly connected to the further driven pulley, and with the pinion being rotatably supported at the base body and being rotationally fixedly connected to the drive shaft.

26. The blow labeler in accordance with claim 10, wherein the first contact region and the second contact region are each formed by a plurality of contact strips, wherein the contact strips of the second contact region are shorter than the contact strips of the first contact region.

27. The blow labeler in accordance with claim 10, wherein the holding platform comprises a base body having a slide arrangement and two retaining brackets which project in the direction of the base platform and at which the slide arrangement is supported.

28. The blow labeler in accordance with claim 10, wherein the air connection device has a multi-passage rotary union to realize a sealed transition for the compressed air and the suction air between the base platform and the holding platform that is rotatable relative to the base platform, with provision being made that the rotary union comprises an outer cylinder and an inner cylinder that is rotatable relative to the outer cylinder by the drive, with the holding platform being rotationally and axially fixedly held at the inner cylinder, and the base platform comprises a further belt drive that is connected downstream of the further electric motor and that has a further drive pulley and a further driven pulley, which further belt drive is part of the further drive, with the further driven pulley being supported at the rotatable inner cylinder via a ball bearing.

29. A price labeling system for automatically weighing and labeling packages comprising a blow labeler for applying labels to packages and a transport apparatus including a weighing belt to weigh the packages and to guide them past the blow labeler, the blow labeler comprising a blower head having a base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface, wherein the air connection device has a multi-passage rotary union to realize a sealed transition for the compressed air and the suction air between the base platform and the holding platform that is rotatable relative to the base platform.

30. The price labeling system in accordance with claim 29, wherein the price labeling system comprises a camera, which is arranged upstream of the blow labeler in a transport direction, to detect a rotational position of a respective package, and a control unit that is connected to the camera and the blow labeler and that is adapted to control the electric motor of the drive of the blow labeler in dependence on the detected rotational position of the respective package.

31. A price labeling system for automatically weighing and labeling packages comprising a blow labeler for applying labels to packages and a transport apparatus including a weighing belt to weigh the packages and to guide them past the blow labeler, the blow labeler comprising a blower head having a base platform, which has an air connection device that comprises a plurality of ports having a compressed air port and at least one suction air port, and a holding platform having a label contact surface that is passed through by a plurality of blow-off openings in fluid communication with the compressed air port and by a plurality of suction openings in fluid communication with the at least one suction air port, wherein the holding platform is rotatably supported at the base platform, wherein the base platform has a drive comprising an electric motor, and wherein the drive is adapted to rotatably drive the holding platform in order to rotate a label held at the label contact surface, wherein the label contact surface comprises a first contact region and a second contact region that is linearly displaceable with respect to the first contact region in a plane of the label contact surface, with the suction openings at least being formed in the second contact region, and with the base platform having a further electric motor that is part of a further drive that is adapted to drive the second contact region in a linearly displaceable manner in order to linearly move a label held at the second contact region.

32. The price labeling system in accordance with claim 31, wherein the price labeling system comprises a camera, which is arranged upstream of the blow labeler in a transport direction, to detect a rotational position of a respective package, and a control unit that is connected to the camera and the blow labeler and that is adapted to control the electric motor of the drive of the blow labeler in dependence on the detected rotational position of the respective package.

* * * * *